Patented Feb. 28, 1950

2,499,003

UNITED STATES PATENT OFFICE 2,499,003

METHOD OF PREPARING 1-CHLORO-2-CARBOXYANTHRAQUINONE

Mario Scalera, Somerville, N. J., assignor to American Cyanamid Company, New York, N. Y., a corporation of Maine No Drawing. Application November 2, 1946, Serial No. 707,537

3 Claims. (Cl. 260—376)

This invention relates to new methods for preparing 1-chloro-2-carboxyanthraquinone.

1-chloro-2-carboxyanthraquinone is an important intermediate for the preparation of certain anthraquinone acridone vat dyes, such as anthraquinone 2-1-(N)-1',2'-(N)-naphthacridone and 4,bz-2,bz-4-trichloroanthraquinone-2,1-(N)-benzacridone. In the past this compound has been produced by chlorination and subsequent oxidation of 2-methylanthraquinone. This process has several disadvantages. In the first place, the chlorination of 2-methyl anthraquinone does not give a pure 1-chloro derivative but a difficultly separable mixture of isomers. In the second place, the oxidation of the chloro methylanthraquinone presents great technical difficulty. In the third place, the yields are low.

The process of the present invention produces a 1-chloro-2-carboxyanthraquinone of a purity which was not hitherto obtainable by any direct process, and when the product of the present invention is condensed with appropriate intermediates to give anthraquinone acridone dyestuffs, the yields are better and the quality of the products is improved, purer colors being obtained.

The process of the present invention, instead of attempting to chlorinate 2-methylanthraquinone, nitrates it, oxidizes the methyl group to the carboxy group, transforms the nitro group into a sulfonic group, and then transforms the sulfonic group into chlorine by ordinary chlorinating agents, such as chlorine, particularly nascent chlorine, produced for example by the reaction of a chloride and a chlorate in acid aqueous solution. Yields are high, and as the nitration can be effected to produce a single compound instead of a mixture of isomers, a product of high purity as well as lower cost is obtained.

While the preferred embodiment of the present invention involves primarily the step of transforming 1-nitro-2-carboxyanthraquinone into the corresponding sulfonic compound, which may be further chlorinated, in the broader aspect the second step is in itself new, regardless of the method by which the 1-sulfo-2-carboxyanthraquinone is obtained, and is broadly included in the present invention.

In the first step of the preferred embodiment of the invention, 1-nitro-2-carboxyanthraquinone is treated with an aqueous solution of an alkali metal sulfite, such as sodium sulfite, preferably with the addition of alkali, resulting in the production of the sodium salt of 1-sulfo-2-carboxyanthraquinone in high yield. The product may be isolated in the form of its alkali metal salt, or preferably the reaction mixture is treated directly with an alkali metal chlorate and excess hydrochloric acid, the 1-chloro-2-carboxyanthraquinone being produced in good yield. Any other chlorinating agent in aqueous medium, such as chlorine itself, may be used in place of the preferred acidic chlorate-chloride mixture.

The process of the present invention not only produces a pure product in excellent yield without the necessity of separating mixtures of isomers, but the whole process operates smoothly in aqueous media without requiring pressure vessels or other expensive process steps. The high yields and smooth reaction are all the more surprising because the general reaction of alkali metal sulfites with nitroanthraquinone derivatives has been only of academic interest because of the low yields obtained and the severe contamination of the desired sulfonic acids with various by-products. It is not known why the reaction behaves so differently with 1-nitro-2-carboxyanthraquinone, and the invention is not limited to any theory as to this anomalous behavior. This step, however, is included in the scope of the invention.

The invention will be illustrated in greater detail in the following specific examples. The parts are by weight.

Example 1

Twenty-nine and seven tenths parts of 1-nitro-2-carboxyanthraquinone (prepared, for instance, by the oxidation of 1-nitro-2-methyl-anthraquinone with dichromate in sulfuric acid) is slurried in about 400 parts of water and 5.6 parts of sodium carbonate added. The slurry is heated to approximately 60° C. and 37.8 parts of sodium sulfite are added.

The reaction mixture is refluxed for about 10 hours and 50 parts of 98% sulfuric acid added. The reaction mixture is clarified; on cooling, it deposits crystals of the sodium salt of 1-sulfo-2-carboxyanthraquinone. The yield is excellent.

Example 2

Thirty-five parts of the sodium salt of 1-sulfo-2-carboxyanthraquinone, prepared as described above, is added to about 400 parts of water and 120 parts of concentrated hydrochloric acid. The reaction mixture is heated to the boil and 21 parts of sodium chlorate dissolved in water is added gradually over about four hours at the boiling temperature. The 1-chloro-2-carboxyanthraquinone separates gradually as a lemon yellow crystalline precipitate. The mixture is boiled four hours longer, cooled, and filtered. The yield is nearly quantitative.

The 1-chloro-2-carboxy anthraquinone so obtained melts at 271–272° C. as compared to a melting point of 250–260° C., which is the best obtainable by practical methods in the oxidation of 1-chloro-2-methylanthraquinone.

*Example 3*

Ten parts of 1-nitro-2-carboxyanthraquinone is slurried in about 200 parts of water and 1.8 parts of sodium carbonate and 40 parts of sodium sulfite are added. The reaction mixture is refluxed for about six hours. After cooling, there is added about 400 parts of water and 32 parts of concentrated sulfuric acid. The reaction mixture is clarified and there is added 45 parts of concentrated hydrochloric acid. A solution of 9 parts sodium chlorate in water is added gradually over a period of four hours at the boil. The chloroanthraquinone carboxylic acid separates gradually as a yellow precipitate. The mixture is boiled for two hours longer, cooled, and filtered. The cake of 1-chloro-2-carboxyanthraquinone is washed and dried.

Since it is immaterial in the process whether the nitro carboxyanthraquinone, and in the last step the sulfo carboxyanthraquinone, are present in the form of the free acids or their water-soluble salts, the generic term "a 1-nitro-2-carboxyanthraquinone" and "a 1-sulfo-2-carboxyanthraquinone" will be used in their normal broad sense as including the free acids and their salts.

I claim:

1. A process for the preparation of 1-chloro-2-carboxyanthraquinone which comprises reacting 1-nitro-2-carboxyanthraquinone with an alkali metal sulfite at elevated temperatures in aqueous solution to form 1-sulfo-2-carboxyanthraquinone, acidifying and reacting the acidified mixture at elevated temperatures with the mixture of a water-soluble chloride and a water-soluble chlorate.

2. A process according to claim 1 in which the chloride and chlorate are sodium chloride and sodium chlorate.

3. A process according to claim 2 in which the alkali metal sulfite is sodium sulfite.

MARIO SCALERA.

REFERENCES CITED

The following references are of record in the file of this patent:

UNITED STATES PATENTS

| Number | Name | Date |
| --- | --- | --- |
| 1,895,100 | Kraenzlein et al. | Jan. 24, 1933 |
| 1,965,818 | Adamson | July 10, 1934 |

OTHER REFERENCES

Ullmann: "Ber. deutsch. Chem. Ges.," vol. 44 (1911), page 3128.

Eckert et al.: "Jour. für prakt. Chem." (2), vol. 102 (1921), pages 332–334.

"Chemical Abstracts," vol. 22, p. 418 (1928), abstracting article by Locher and Fierz in "Helv. Chim. Acta," vol. 10, pp. 642–670 (1927).

Coppens: "Rec. trav. Chim. des Pays-Bas," vol. 44 (1925), pages 913–915.

Houben: "Das Anthracen und die Anthrachinone" (1929), pages 299–300.